United States Patent
Pomerantz

(10) Patent No.: US 6,517,038 B1
(45) Date of Patent: Feb. 11, 2003

(54) ADHESIVE HANG TAB

(76) Inventor: Carl Pomerantz, 567 Lakeshore Blvd., Beaconsfield. Que. (CA), H9W 4K3

( * ) Notice: Subject to any disclaimer, the term of this patent is extended or adjusted under 35 U.S.C. 154(b) by 0 days.

(21) Appl. No.: 09/432,267

(22) Filed: Nov. 2, 1999

Related U.S. Application Data

(60) Provisional application No. 60/106,785, filed on Nov. 3, 1998.

(51) Int. Cl.$^7$ ............................................. H04N 5/232
(52) U.S. Cl. ..................... 248/214; 248/205.3; 248/467
(58) Field of Search ................................ 248/467, 214, 248/205.3, 317, 223.41

(56) References Cited

U.S. PATENT DOCUMENTS

| | | | |
|---|---|---|---|
| 855,338 A | * 3/1907 | Margulis | .......................... 52/4 |
| 3,850,059 A | 11/1974 | Kang | ................................ 83/7 |
| 3,884,443 A | 5/1975 | McMaster | .................... 248/467 |
| D288,744 S | * 3/1987 | Alshooler | .................... D8/373 |
| D300,836 S | * 4/1989 | Goldstein | .................... D20/43 |
| 4,832,301 A | 5/1989 | Hiromoto et al. | ........... 248/359 |
| 4,863,128 A | 9/1989 | Good | ....................... 248/205.3 |
| 4,890,809 A | 1/1990 | Good | .......................... 248/317 |
| 5,020,761 A | 6/1991 | Good | .......................... 248/337 |
| 5,328,137 A | 7/1994 | Miller | ...................... 248/223.4 |
| 5,437,428 A | * 8/1995 | Mirza | .......................... 248/467 |
| 5,542,634 A | 8/1996 | Pomerantz | ................... 248/214 |
| 5,676,032 A | 10/1997 | Johnson | ....................... 83/697 |

* cited by examiner

Primary Examiner—Leslie A. Braun
Assistant Examiner—Steven M. Marsh
(74) Attorney, Agent, or Firm—Mila Shuartsman

(57) ABSTRACT

The present invention is related to n adhesive hang tab for suspension of an object to a support, comprising a main body having two opposite surfaces, which is divided into a non-coated upper portion provided with an aperture adapted for secure suspension of the object onto the support and an adhesive lower portion provided with a pressure-sensitive coating. The adhesive portion is further provided with two legs extending laterally downwardly from the adhesive portion, those legs being also provided with the pressure-sensitive coating. Legs are forming a channel spaced between said legs. The present invention also includes a method of making an adhesive hang tabs, said method comprising applying a liner strip and an adhesive pressure-sensitive coating to designated areas of a tab substrate to form a composite tab substrate and die-cutting a plurality of hang tabs from composite tab substrate in a such manner that tabs are arranged on the substrate in at least two opposing interlocking rows and legs of hang tabs of one row are facing legs of hang tabs of the opposite row. Adjacent legs of two hang tabs of said row are accommodated within a channel formed between legs of one hang tab of the opposing row.

15 Claims, 3 Drawing Sheets

(1 of 3 Drawing Sheet(s) Filed in Color)

ADHESIVE HANG TAB

This application claims the benefit of provisional application No. 60/106,785, filed Nov. 3, 1998.

The present invention is related to hang tabs and more particularly to hang tabs provided with a pressure-sensitive coating provided on at least one of its two surfaces.

There is known U.S. Pat. No. 5,542,634 comprising an adhesive hang tab provided with channels in the adhesive zone to limit and arrest peel propagation.

There are also known U.S. Pat. Nos. 5,020,761; 4,890,809 and 4,863,128 describing various forms of adhesive hang tabs.

There are many models of hang tabs that are used to display products on peg hook at retail, however in these and other conventional tab designs, the adhesive zone is generally of rectangular configuration. The reason for such configuration relates to simplicity of design and ease of manufacture.

Typically, the conventional production of hang tabs uses a rotary die-cutting process, wherein a lamination consisting of a continuous strip of releasable paper liner, adhesive and flexible plastic are passed under a rotary die-cutting blade which will cut out the desired shape of the tab.

In the effort to economize on material between pieces, and to minimize tooling costs, it is often desirable to have adjacent pieces to share the same common cutting edges. As a result, while no material in the adhesive zones need to be discarded, the final pieces have sharp corners (see FIGS. 1 and 2) which is undesirable in use.

Using this conventional method, if rounded corners are desired, it is necessary to separate or space the layout of pieces on the tool so that corners of the final piece can be rounded (see FIG. 3). However, it then becomes necessary to discard the material between adjacent pieces, which produces undesirable and costly waste material.

Whether conventional corners are rounded or squared, the resulting adhesive zone of the tab is always substantially rectangular.

The analysis made by the inventor of the present invention had proven that once an article is suspended by the hang tab, the shear forces in the adhesive zone are not distributed uniformly across the adhesive zone. Referring to FIG. 4 there is illustrated a two dimensional plane stress analysis conducted using Ansys Software version 5.5.1 using finite element analysis of 10,000 nodes of a conventionally shaped hang tab made of a semi-rigid material with modulus of elasticity of 290,000 psi with Poisson ration of 0.4 and tab thickness of 0.014 inches.

For the purpose of this simulation, a one unit point load was applied upward to the top of the aperture, while the adhesive zone supported a flat body with a weight of one unit. As diagram of the shear load of FIG. 4 indicates, the stress distribution across the adhesive zone of the tab is such that the shear load stresses are concentrated in the laterally remote portions of the adhesive zone, while the lower mid-section of the adhesive zone experiences only minor shear stresses. This discovery indicates that the lower central portion of the adhesive zone of the tab contributes proportionably less by area to support the vertical load compared to laterally extreme portions of the adhesive zone. The analysis shows that the lower central portion comprising 33% of the adhesive zone area contributes less than 1% to support the vertical load.

The present invention is based on this discovery and provides the improved configuration of the adhesive zone resulting in more material efficient product by using optimized geometry of the hang tab.

Another beneficial feature of the present invention is that adjacent tabs can be configured to share a common edge in combination with a possibility to make all outer corners rounded without having to generate waste material. The only sharp blended edge is interior of the adhesive zone of the piece and this sharp point is not exposed during use.

SUMMARY OF THE PRESENT INVENTION

According to the present invention there is provided an adhesive hang tab for suspension of an object to a support, comprising a main body having two opposite surfaces, said main body is divided into a non-coated upper portion provided with an aperture adapted for secure suspension of said object onto said support and an adhesive lower portion provided with a pressure-sensitive coating; said adhesive portion is further provided with two legs extending laterally downwardly from said adhesive portion, said legs being also provided with the pressure-sensitive coating; wherein said legs are forming a channel spaced between said legs.

In one embodiment said channel having a substantially rectangular configuration. In the other embodiment all corners of said hang tab and inner corners of said channel are being rounded.

The present invention may further be provided with at least two slits extending from said central aperture into said lower adhesive portions, said slits are provided to resist peeling force during the use.

According to the present invention there is also provided a method of making an adhesive hang tabs, said method comprising:

applying a liner strip and an adhesive pressure-sensitive coating to designated areas of a tab substrate to form a composite tab substrate; and die-cutting a plurality of hang tabs from said composite tab substrate in a such manner that said tabs are arranged on said substrate in at least two opposing interlocking rows, wherein legs of hang tabs of one row are facing legs of hang tabs of the opposite row, and wherein adjacent legs of two hang tabs of said one row are accommodated within a channel formed between legs of one hang tab of the opposing row.

In one embodiment hang tabs of each of said opposing interlocking rows are placed side by side without any gaps left between each adjacent tab and the legs of said one row is interlocked within channels between legs of said another row without any gap left within said channels.

DESCRIPTION OF THE PREFERRED EMBODIMENT

Figure 5:
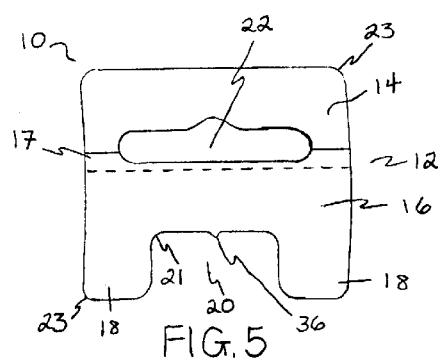
FIG. 5 shows first embodiment of the hang tab according to the present invention.

Referring now to drawings, FIG. 5 shows a hang tab 10 of the first embodiment of the present invention. Main body portion 12 of tab 10 is divided into an upper non-coated portion 14 provided with a central aperture 22 used for hanging tab 10 with an attached object to a display hook (not shown). Lower adhesive portion 16 has legs 18 extending laterally downwardly from said adhesive portion 16. A channel 20 is formed between those extended legs 16. In the first embodiment inner corners 21 of channel 20 are rounded. Lower adhesive portion 16 and legs 18 are provided with a pressure sensitive coating. All outer corners 23 of hang tab 10 including legs 18 are rounded to make tab 10 user-friendly. The only one sharp point is an apex 36 located on an interior edge of the adhesive portion 16 within the channel 20. Protective paper liner 17 extends beyond the adhesive zone into the non-coated portion 14 of the tab 10.

Figure 1:
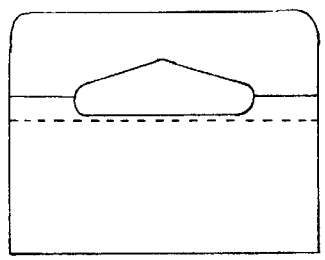
FIG. 1 shows a plan view of Prior Art hang tab provided with an adhesive zone of rectangular configuration.
Figure 6:
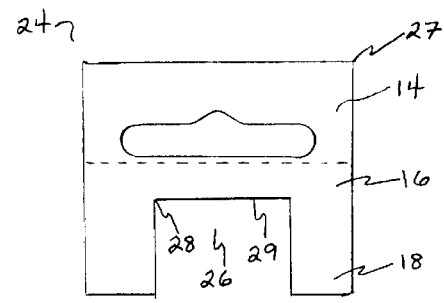
FIG. 6 shows second embodiment of the present invention.
Figure 4:
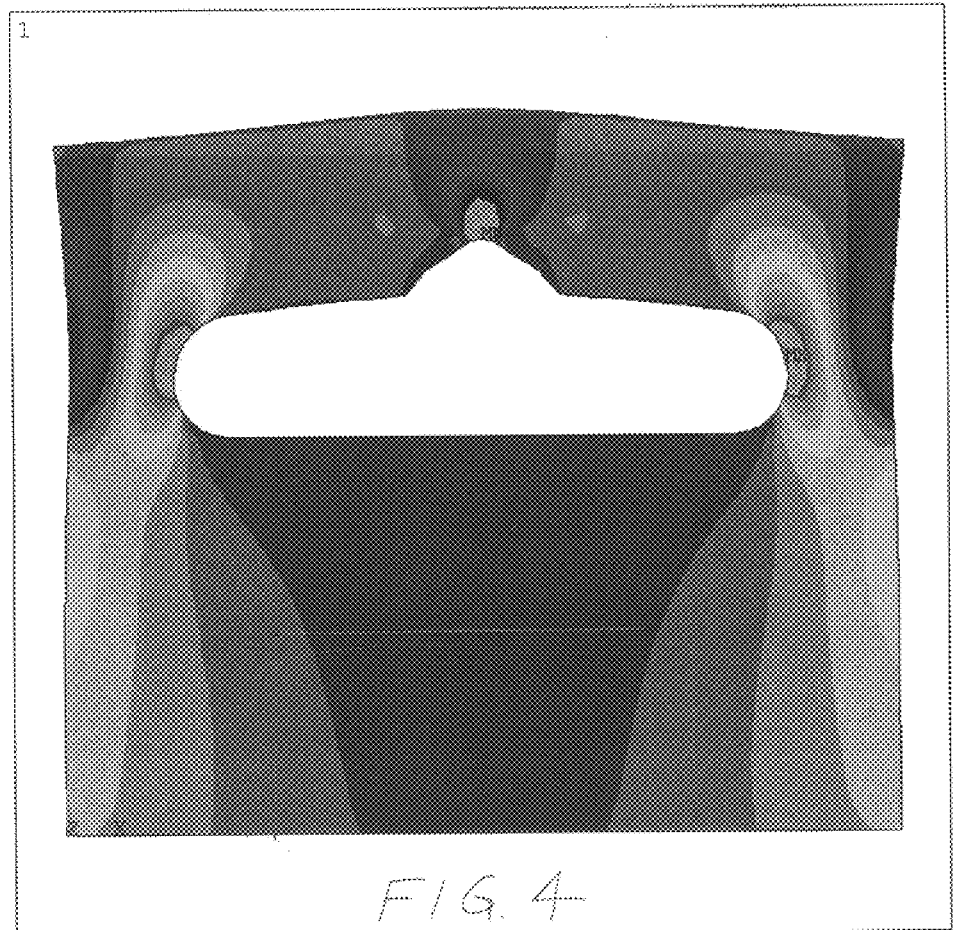
FIG. 4 shows a diagram of the stress distribution of the hang tab of FIG. 1.

FIG. 6 shows a hang tab 24 of the second embodiment of the present invention, which is similar to FIG. 1, except the fact that all outer corners 27 of tab 24 including legs 18 and inner corners 28 of the rectangular channel 26 are not rounded. In this embodiment the interior edge 29 of the adhesive portion 16 is smooth.

Figure 7:
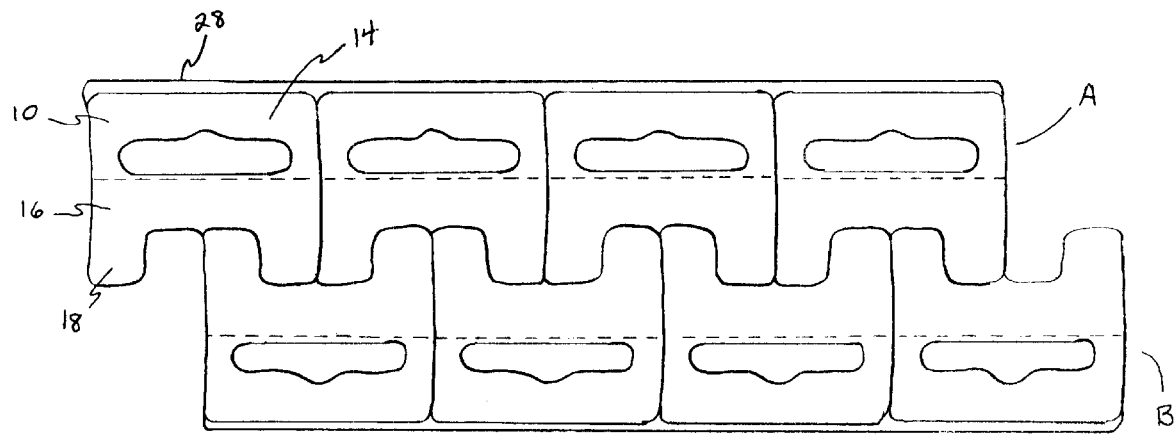
FIG. 7 shows two-row assembly of hang tab of FIG. 3 on continuous sheet of liner.

FIG. 7 shows arrangements of tabs 10 according to the first embodiment of the present invention comprising at least two opposed rows of tabs 10 positioned in a staggered configuration such a way that adjacent legs of two tabs from one row are accommodated within a channel formed between legs of one tab of the opposed another row. The shape of this channel 20 can be vary greatly depending on degree and depth of interlocking desired between rows. As well, the shape of the channel can be rectangular, angular, convoluted or sub-divided, irregular, etc., but still falls within the scope of the present invention. The advantage of such arrangement is absence of any discarded scrap material in the adhesive zone since there are no gaps left between corresponding tabs of said two opposed rows. However, the present invention is not restricted to such preferred arrangement and it may be some gap left between tabs of each row or between adjacent legs of tabs one row accommodated with a channel of one tab of the opposed another row, even though it will produce some scrap material.

Figure 8:
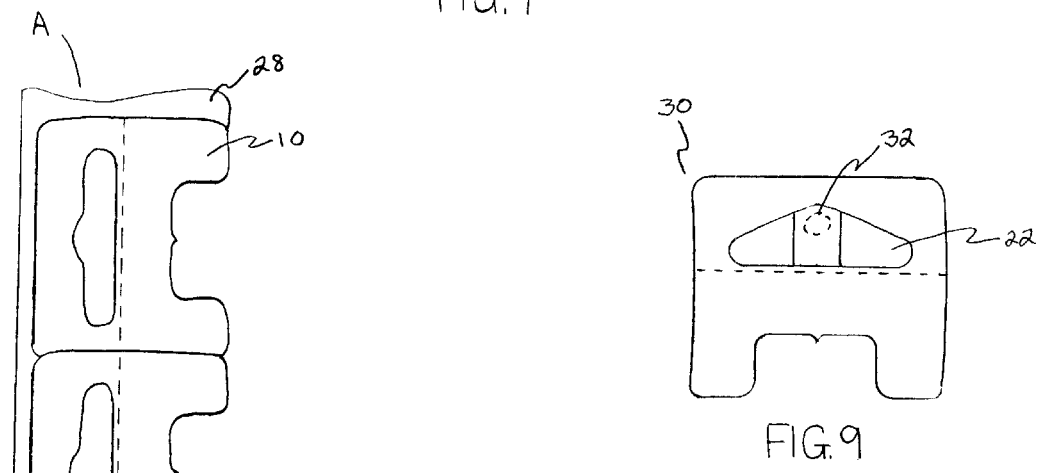
FIG. 8 shows one row assembly of hang tabs of FIG. 3.

FIG. 8 shows another possible configuration of tabs arrangement, which is similar to FIG. 7 except the fact that downstream of the cutting operation, to rows can be separated and rewound on two separate strips.

Figure 9:
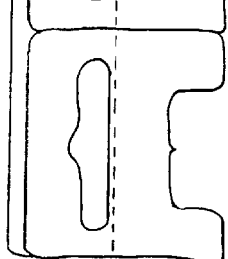
FIG. 9 shows third embodiment of the present invention.

FIG. 9 shows a hang tab 30 made according to the third embodiment of the present invention, which is similar to FIG. 1, except presence of a bendable flap 32 located in the central region of the central aperture 22. This bendable flap 32 is forming an opening within said central region for suspending said hang tab 30 on a single wire hanger (not shown). The arrangement of said flap 32 is similar to one shown in U.S. Pat. No. 5,020,761.

Figure 10:
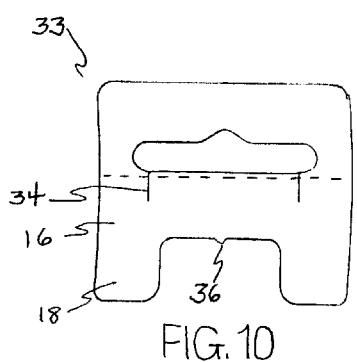
FIG. 10 shows fourth embodiment of the present invention.

FIG. 10 shows a hang tab 33 made according to the fourth embodiment of the present invention and is similar to FIG. 5 except presence of two expending slots or slits 34 provided to resist peeling forces while in use. Those slots are extending into the adhesive portion 16 and are similar to structure of hang tab of U.S. Pat. No. 5,542,634.

Hang tabs of the present invention are typically made from a synthetic resin, such as PVC, HDPE, PETG, polyethylene or polyethylene terephthalate. The tab substrate or sheet is flexible and relatively thin having a thickness between 0.004 and 0.02 inches.

There are several commonly known methods of manufacturing of adhesive hang tabs. One of those methods is related to a rotary die cutting, as described in U.S. Pat. No. 3,850,059 using a continuously moving web or a sheet material without interrupting the movement of the material. In typical application, moving web or sheet of material are passed between a rotary cutting roller and an anvil roller.

Cutting elements or rules are mounted on the cutting roller for rotation therewith. The axis of rotation of the cutting roller and the anvil roller are parallel and displaced by an amount such that at their points of closest proximity the cutting rules penetrate the surface of the web material as the material passes between the rotary die cutting rules and the anvil roller.

The rotary die itself is comprised of rotary steel cutting knives that act as a fixed knife from a solid piece of steel which appears like a cookie cutter used in baking. The die can also be made from a flat, flexible piece of steel and then wrapped and fastened around s steel cylinder to form the rotary die.

As the material passes between the rotary die and the anvil roller, the cutting rules penetrate the surface of the material, and a resistance to penetration of the cutting die into the material must be overcome by the reaction force within the rotary die cutter and the anvil roller. The greater the resistance to penetration, the more stresses the rollers are subjected to. The greater these stresses, the more power required to power the process and the greater the wear on the tooling and support assembly.

Figure 2:
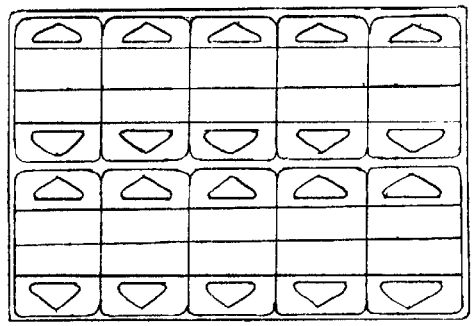
FIG. 2 shows Prior Art assembly of hang tabs where common cutting edges are shared to produce tabs on a continuous sheet of liner.
Figure 3:
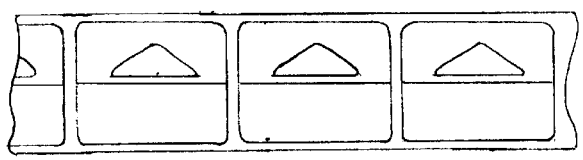
FIG. 3 shows a configuration of Prior Art hang tabs where rounded corners are desired, and tabs are produced on continuous roll

The resistance to penetration is greatly affected by the surface toughness of the material being cut and the length of blade that simultaneously penetrates the material at point of contact, as the material passes between the rotary die cutting rules and the anvil roller. The geometry of fabrication is such that the adhesive zone is parallel to the path of the web, and in prior art configurations, where material has been saved by tabs sharing common edges (see FIG. 2), tabs are typically cut butt to butt which results in greater resistance to penetration during fabrication.

The geometry of the present invention, as shown on FIG. 7, allows for a staggered cutting die cavity configuration, which reduces this stress concentration across the web, so that the tooling and die assembly and equipment are subjected to less stress, while economies of material are achieved. As well, the sides of the tab can be slightly curved to further reduce stress concentration across the web during fabrication.

Another common method of manufacture is flat steel rule die cutting, wherein the material being cut is typically in non-contiuous sheet form Steel rule cutting dies, as described in U.S. Pat. No. 5,676,032, are commonly used for cutting cloth- like materials, as well as synthetic materials, such as vinyl or the like. A steel rule cutting die typically comprises a base substrate or backing board in which a groove matching the desired pattern to be cut is formed. A length of sharpened blade, known as a steel rule, is formed to the shape of the desired pattern to be cut and is embedded in the corresponding groove in the board. The steel rule has a sharpened cutting edge extending away from the board. A single steel rule cutting die is often constructed with multiple blades or cavities as to enable cutting of multiple patterns with a single pass through the press. Multiple cavities or patterns can be nested together on the substrate in an efficient configuration to minimize scrap.

The present invention could also be produced using this method of manufacture with adjacent cavities sharing common knife blades and the resulting economies of material being achieved.

According to the method of the present invention, an adhesive coating and protective liner of predetermined width and location are applied on a tab substrate or web made of flexible synthetic material, thus forming a composite tab substrate or web. In one embodiment a protective liner being extended from said coated until the edge of said uncoated area. In another modification protective liner is being extended into said non-coated area. Alternatively, the liner can be zone-coated, i.e. coated with adhesive along a strip and this composite is then laminated onto the tab web. Several parallel strips of adhesive and liner can be laid down onto the web simultaneously, or for example, to produce sheets containing several rows of tabs. The most important aspect of the method according to the present invention is the way how those tabs have to be cut from the composite substrate or web: tabs are arranged on said substrate in at least two opposing interlocking rows A and B, wherein legs 18 of hang tabs 10 of the row A are facing legs 18 of hang tabs 10 o the opposite row B, and adjacent legs of two hang tabs o the row A are accommodated within the channel 20 formed between legs of one hang tab 10 from the opposite row B. In the preferred embodiment of FIG. 7 there are no gaps neither between each adjacent tab of each row, nor gaps within channels of tabs accommodating legs of tabs from the opposite row. However, the present invention is not restricted to such arrangement and some possible gaps may be left.

In case of using rotary die cutting method, this composite tab substrate is then passed between rotary die cutter and anvil roller, wherein rotary die is configured to produce the tab in several formats by adjusting the depth of cut of the blades.

For example, to produce single loose, tabs (see FIG. 5) the cutting blades will penetrate all layers of composite tab substrate around the outer perimeter of each tab. If it is desired to produce tabs in roll form (see FIG. 7), the cutting blades will penetrate the flexible material and adhesive zone, but will not penetrate the liner 28, so that the liner 28 is used as a means of anchoring or attaching tabs onto a continuous strip of liner. If it is desired to produce tabs in sheet form, the cutting blades will penetrate the flexible material and adhesive zone, but will not penetrate the liner within a given area of desired sheet size, and again the liner is used as anchoring means attaching tabs onto the sheet. In any of those modifications, cutting blades may not penetrate some areas of the material filly in order to achieve various desired effects within the scope of the present invention. For example, the central aperture may be hinged by leaving certain portions around its perimeter uncut, thereby reducing the number of loose pieces produced by cutting out a full aperture. Likewise, the liner may be "kiss-cut" in various regions, i.e., the blades can be designed to penetrate the flexible material and/or adhesive zones, without filly penetration the liner so that the liner remains intact where desired.

In case of using a flat steel rule die cut method of manufacture, all steps are the same except that individual sheets are used as opposed to continuous strips or rolls.

One of the advantages of the tab arrangement according to the present invention is reduction of stress imposed on cutting blades in view of the fact that common cutting edges along vertical sides of one row of tabs are staggered in relationship to common cutting edges along vertical sides of the opposing row.

Other alternative methods, such as laser etching or heated die cutting could be also used to extract the shape and arrangement of the present invention.

Although in the preferred embodiment it is most efficient to use common knife edges between adjacent cavities in the cutting die, it is also falls within the scope of the present invention to extract tabs in a similar interlocking manner, yet leave a slight gap between adjacent cavities. For example, when manufacturing the tab using a male-female type punch and die, the preparation of composite material is fed beneath the die head that may contain multiple cavities where each cavity is separated by gaps of typically 0.050 to 0.250 inches, or in a multi-step process where gaps are further minimized.

All of the tabs of the above described embodiments are of a type having a through central aperture as a hang means, the present invention is not restricted to such arrangement and there are other various hanging means that could be used for the same purpose. For example, if an adhesive is coated on section 14 of FIG. 5 so as to held the section fixed to the upper part of the tab, then it will be possible to hang a product by the mere force of adhesion without using a rod to pass through zone 14.

Numerous and varied other arrangements may be utilized by those skilled in the art without departing from the spirit and scope of the invention.

I claim:

1. An adhesive hang tab for suspension of an object to a support, comprising
   a main body having two opposite surfaces,
       said main body is divided into a non-coated upper portion provided with an aperture adapted for secure suspension of said object onto said support and
   an adhesive lower portion provided with a pressure-sensitive coating;
       said adhesive portion is further provided with two legs extending laterally downwardly from said adhesive portion, said legs being also provided with the pressure-sensitive coating;
       wherein said legs are forming a channel spaced between said legs, and
       wherein in an operable position said upper portion is configured to be extended upwardly from said lower portion, and wherein in said operable position the main body forms a single-layer structure throughout the entire area of said tab.

2. The adhesive hang tab according to claim 1, wherein said channel having a substantially rectangular configuration.

3. The adhesive hang tab according to claim 2, wherein all corners of said hang tab and inner corners of said channel are being rounded.

4. The adhesive hang tab according to claim 3, wherein said tab is further provided with at least two slits extending from said aperture into said lower adhesive portion, said slits are provided to resist peeling force during the use.

5. The adhesive hang tab according to claim 1, wherein said hang tab further comprising a protective liner covering said adhesive portion including said legs.

6. The adhesive hang tab according to claim 5, wherein said protective paper liner being extended from said adhesive coated portion into said non-coated portion to facilitate easy removal of said liner before the use.

7. The adhesive tab according to claim 1, wherein said aperture of said non-coated portion is further provided with a central bendable flap forming an opening within a central region of said aperture, said opening is provided for suspension of said hang tab on a single wire hanger.

8. An adhesive tab for attachment of an object to a support, comprising a main body having two opposite surfaces,
said main body is divided into an upper portion having a front surface and a back surface, said upper portion comprises an attachment means provided for secure attachment of said object to said support and an adhesive lower portion having a front surface and a back surface, said lower portion is provided with a pressure-sensitive coating;
said adhesive portion is further provided with two legs extending laterally downwardly from said adhesive portion, said legs being also provided with the pressure-sensitive coating;
wherein said legs are forming a space extending between said legs;
said tab having an initial or non-operable position and an operable position, wherein in both of said positions said upper portion extends upwardly from said lower portion in such a way that the front surface of said upper portion remains facing in the same direction in both of said positions.

9. The adhesive tab according to claim 8, wherein said upper portion is non-coated, said space having a substantially rectangular configuration, and wherein said attachment means comprises an aperture formed in said upper portion.

10. The adhesive tab according to claim 9, wherein all corners of said tab and inner corners of said channel are being rounded.

11. The adhesive tab according to claim 10, wherein said tab is further provided with at least two slits extending from said aperture into said lower adhesive portion, said slits are provided to resist peeling force during the use.

12. The adhesive tab according to claim 8, wherein said tab further comprising a protective liner covering said adhesive portion including said legs.

13. The adhesive tab according to claim 12, wherein said protective paper liner being extended from said adhesive coated portion into said non-coated portion to facilitate easy removal of said liner before the use.

14. The adhesive tab according to claim 10, wherein said aperture of said non-coated portion is further provided with a central bendable flap forming an opening within a central region of said aperture, said opening is provided for suspension of said hang tab on a single wire hanger.

15. The adhesive tab according to claims 8, wherein said attachment means comprises a pressure-sensitive coating covering said upper portion.

* * * * *